United States Patent [19]

Pick

[11] 4,063,784
[45] Dec. 20, 1977

[54] TWO-PRESSURE BRAKE CONTROL VALVE FOR AIRBRAKES

[75] Inventor: Peter Pick, Munich, Germany

[73] Assignee: Knorr-Bremse GmbH, Munich, Germany

[21] Appl. No.: 769,334

[22] Filed: Feb. 11, 1977

[30] Foreign Application Priority Data

July 30, 1976 Germany .............................. 2634453

[51] Int. Cl.² .............................................. B60T 15/22
[52] U.S. Cl. ......................................... 303/69; 303/36
[58] Field of Search ....................... 303/36, 37, 46, 68, 303/69, 74

[56] References Cited

U.S. PATENT DOCUMENTS

| 2,012,375 | 8/1933 | Campbell | 303/69 X |
| 3,370,893 | 2/1968 | McClure et al. | 303/36 |
| 3,966,269 | 6/1976 | McEathron | 303/69 X |

*Primary Examiner*—Duane A. Reger
*Attorney, Agent, or Firm*—Edmund M. Jaskiewicz

[57] ABSTRACT

A two-pressure brake control valve has a service brake portion which is connected to a brake line, an auxiliary reservoir, an emergency reservoir and a brake cylinder. A main piston in the service brake portion is subjected to brake line pressure on one side and on its other side is subjected to pressure in the auxiliary reservoir. An auxiliary piston which has a greater sensitivity of response than the main piston is displaceable on the main piston and has one side subjected to the brake line pressure and its other side subjected to auxiliary reservoir pressure. A release acceleration valve is connected to the brake line and has an actuator in the displacement path of the auxiliary piston so as to be actuated to an open position upon movement of the auxiliary piston in the initial phase of a brake release operation. There is also a filling valve which is actuated in response to movement of the auxiliary piston to connect the emergency reservoir to the auxiliary reservoir during the release operation.

16 Claims, 4 Drawing Figures

TWO-PRESSURE BRAKE CONTROL VALVE FOR AIRBRAKES

The present invention relates to a two-pressure brake control valve for a single stage releasing indirectly acting airbrake for railway vehicles having a service brake portion connected to a brake line, an auxiliary reservoir, an emergency reservoir and a brake cylinder, more particularly, to a release acceleration device for such a control valve.

Various forms of brake control valves have been utilized in air braking systems for railway and other vehicles. One such brake control valve comprises a two-pressure control valve for a single stage releasing indirectly acting air brake system and having a service portion and an emergency portion both of which are connected to a brake line, an auxiliary reservoir, an emergency reservoir and to at least one brake cylinder. The service brake portion is provided with a main control piston actuated by the difference between the brake line pressure and the auxiliary reservoir pressure and this piston actuates a brake accelerator having an overflow chamber in order to provide uniform and rapid application of the brakes. Also in the service brake portion is a brake valve which permits air from the auxiliary air reservoir to act upon the brake cylinder and a release valve for venting the brake cylinder. There is further provided a release acceleration valve which is actuated in response to the difference between the brake line pressure and the auxiliary reservoir pressure. The release acceleration valve in the initial phase of the brake release operation connects the emergency brake reservoir to the brake line so that this reservoir can be filled with air and during the release operation connects the emergency brake reservoir to the auxiliary brake reservoir.

Such release acceleration valves must comply with the requirement that when the reservoirs are refilled during a normal brake release operation of the brakes on the vehicles of a train, the release operation of individual brakes on a vehicle should not be started until the pressure in the brake line is built up sufficiently to secure a release of brakes in the adjacent vehicles.

To meet this requirement, it is necessary that during a brake release operation the main control element in the service brake portion reacts initially to connect the brake cylinder to the atmosphere and that subsequently before the main control element reaches its normal filling position to fill the auxiliary air reservoir with air from the brake line, release acceleration occurs and only then provides required filling connections. These connections are filling of the auxiliary air reservoir from the brake line through the main control element, a filling connection between the auxiliary air reservoir and the emergency brake reservoir and a filling connection between the brake line and the auxiliary air reservoir.

These conditions can not be reliably and precisely obtained in known brake control valves since the release acceleration device is structurally and functionally separated from the main control element of the service brake portion. In addition, there is no definite inter-relationship of the release acceleration device with the structure for filling as described above.

A further disadvantage of known brake control valves is that the main control element of the service brake portion does not actuate a service brake acceleration device which is operative or effective at every stage of braking.

It is therefore the principal object of the present invention to provide a novel and improved two-pressure brake control valve for a single stage releasing indirectly acting air brake for railway vehicles and the like.

It is another object of the present invention to provide such a brake control valve having a release acceleration device which is a structural and functional component of the service brake portion.

It is a further object of the present invention to provide such a brake control valve having an improved release acceleration device and improved filling device operative during the brake release operation.

According to one aspect of the present invention there is provided a two-pressure brake control valve for a single stage releasing indirectly acting air brake for railway vehicles having a service brake which is connected to a brake line, an auxiliary reservoir, an emergency reservoir and a brake cylinder. The service brake portion has a main piston therein which is connected so that one side of the piston is subjected to brake line pressure and the other side is subjected to the pressure in the auxiliary reservoir so that the piston is displaceable in response to the difference in these pressures. An auxiliary piston is slideably displaceable in the main piston between two end positions and has one side subjected to brake line pressure and the other side subjected to auxiliary reservoir pressure. The auxiliary piston has a greater sensitivity of response to pressure difference than the main piston. A release acceleration valve is connected to the brake line and to the emergency reservoir. Actuating elements for the release acceleration valve and a filling device are disposed in the displacement path of the auxiliary piston so as to be responsive to movement of this auxiliary piston to open the release acceleration valve so as to connect the emergency reservoir and the brake line in the initial phase of a release operation. A filling device is operated by its actuating element to connect the emergency reservoir to the auxiliary reservoir during the release operation.

Other objects and advantages of the present invention will be apparent upon reference to the accompanying description when taken in conjunction with the following drawings, which are exemplary, wherein:

Proceeding next to the drawings wherein like reference symbols indicate the same parts throughout the various views a specific embodiment and modifications of the present invention will be described in detail.

Figure 1:
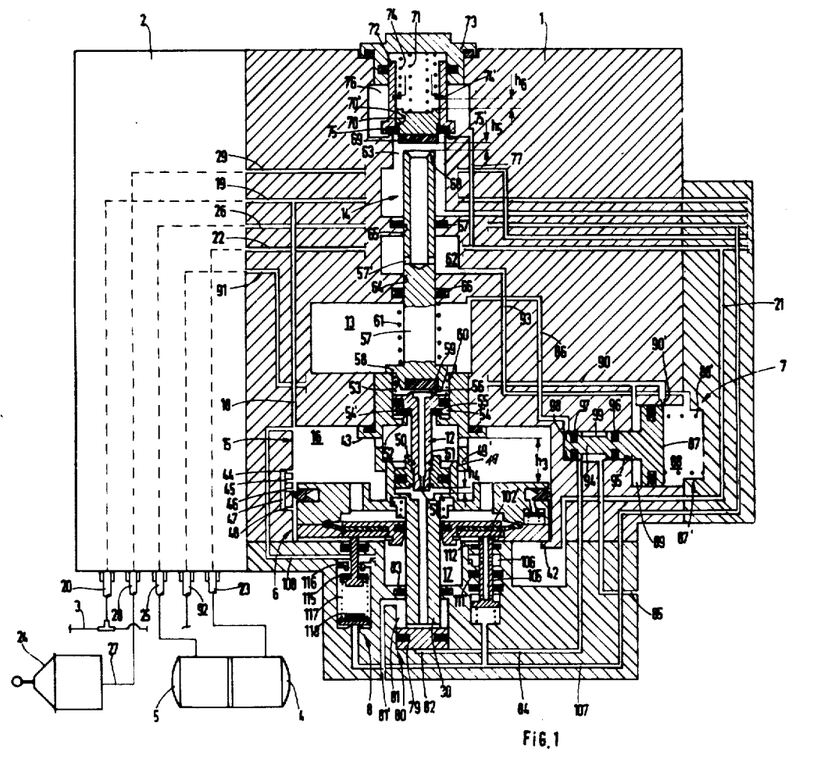
FIG. 1 is a diagrammatic view, in section, of the service brake portion of the brake control valve of the present invention and showing the main control piston in its lower end position.

In FIG. 1, there is shown a service brake portion 1 of a brake control valve which controls the brake functions as a single release procedure wherein a brake cylinder is completely vented during a partial increase of pressure in a brake line (L-line) 3 by means of pressure in an auxiliary air reservoir (R) 4. The left side of the service brake portion 1 is bolted to the right flange of a valve support 2 which is attached to the frame of the vehicle in a known manner. On the left flange of the valve support there is attched an emergency brake portion, which is not illustrated, which together with the service brake portion 1 constitutes the brake control valve. On the right side of the service brake portion 1 as shown in FIG. 1 there is attached a release valve portion having a rapid release valve which is not illustrated.

The emergency brake portion and the release brake portion including the rapid release valve may be known valve components that can be assembled together with the service brake portion 1 to constitute a single-release brake control valve.

Service brake portion

The service brake portion structure and operation will next be described. The emergency brake portion and the release brake portion need not be described in order to comprehend the present invention.

The service brake portion 1 comprises a main control element 6, a balance valve 7, a release acceleration valve 8 and a pressure limiting valve which is not illustrated but is utilized in a known manner for automatic setting of the minimum brake pressure in a brake cylinder 24 independently of lowering the pressure in the brake line 3.

The main control element 6 comprises three coaxially positioned control components including a main control piston 10 in which is mounted an auxiliary control piston 11, an accelerator valve device 12 having an overflow chamber 13 and a brake release control valve device 14.

The main control piston 10 is slideably displaceable and sealed against pressure leaks in a main cylindrical chamber 15 which is divided by the piston 10 into a cylindrical sub-chamber 16 (L) which is connected to the brake line 3 and a sub-chamber 17 (R) which is connected to the auxiliary air reservoir 4. The subchamber 16 is connected to the brake line 3 through passages 18, 19 and a coupling 20 on the valve support member 2. The sub-chamber 17 is connected to auxiliary reservoir 4 through passages 21, 22 and a coupling 23. An emergency brake reservoir 5 ($R_1$) is flanged on to the auxiliary air reservoir 4 in a known manner. During a rapid braking operation the emergency brake reservoir 5 coacts with the auxiliary air reservoir 4 in order to provide the brake cylinder 24 with a brake cylinder pressure which is 15-20% greater than the pressure existing at a full service brake operation. This higher pressure permits attaining the emergency braking action. The emergency reservoir 5 is connected to a coupling 25 on the valve support member 2 which connects to a passage 26 in the service brake portion 1 and also connects to the emergency brake portion which is not shown in the drawing.

Brake cylinder 24 is connected through a brake cylinder line 27 (C-line) to a coupling 28 on the valve support member 2 which establishes a connection to a C-passage 29 in the service brake portion 1.

Figure 1A:
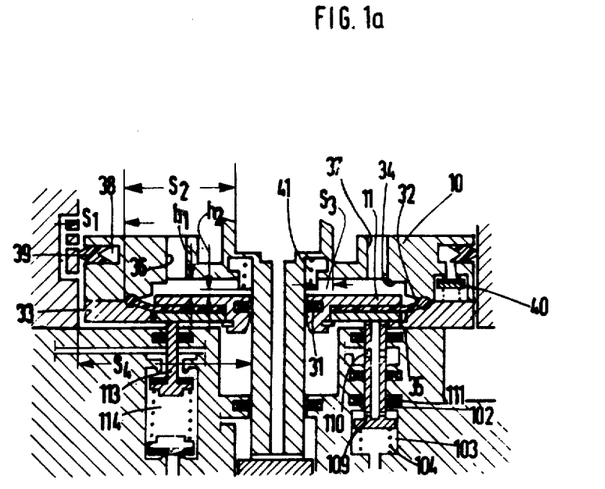
FIG. 1a is a portion of FIG. 1 but in enlarged scale to show the main and auxiliary pistons.

As can be best seen in FIG. 1a the main piston 10 has a central tubular piston rod 30 upon which the auxiliary piston 11 is guided by means of a central opening having a packing 31 sealingly engaging the tubular rod 30.

The auxiliary piston 11 is of the diaphragm piston type and has a radially projecting diaphragm 32 on its outer periphery which diaphragm is tightly clamped between the bottom surface of main piston 10 and a ring element 33 attached to the piston 10 as shown in FIG. 1a. The bottom surface of main piston 10 is provided with a recess within which the auxiliary piston 11 is displaceable and this bottom surface is directed toward the piston 11. The inner surface of ring element 33 which faces toward the auxiliary piston 11 has such a shape that the piston 11 is sealingly displaceable within the main piston 10 along the tubular piston rod 30 through a maximum displacement or stroke $h_1$. The stroke $h_1$ is defined by an upper stop 34 on the bottom of the main piston 10 and a lower stop 35 on the inner surface of ring element 33 as shown in FIG. 1a.

A spring 41 is supported between upper stop 34 and auxiliary piston 11 so that the lower end of the spring is spaced from the piston 11 as seen in FIG. 1a. The auxiliary piston 11, as it is displaced upwardly in the main piston 10, engages the lower end of spring 41 before the piston 11 abuts stop 34 in its upper end position against the force of spring 41. The spring 41 may also be mounted on the upper surface of auxiliary piston 11. The displacement of the auxiliary piston 11 between its lower stop 35 and engagement with spring 41 is indicated at $h_2$.

The main piston 10 has an annular groove 38 on its peripheral surface and a dovetail-shaped packing ring 39 is inserted into the groove 38 and is subjected to pressure in L-sub-chamber 16 so as to be urged radially outwardly to sealingly engage the wall of the chamber 15. In order to avoid excessive pressure against the packing ring 39, a check valve 40 is provided which communicates with the groove 38 and permits the flow of air under pressure from L sub-chamber 16 into R-sub-chamber 17 but blocks the flow in the opposite direction.

The main piston 10 is provided on its upper surface as seen in FIG. 1 with an upwardly opening cylindrical extension 49 which surrounds and is coaxial with the upper outlet of the tubular piston rod 30. A control piston 50 which is a component of the accelerator valve device 12 is slideably displaceable and sealed against pressure losses in the cylindrical extension 49. The cylindrical extension 49 is also slideably engageable within a downwardly opening cylindrical extension 49' which projects into the L-sub-chamber 16 and functions to guide the main control piston 10.

The control piston 50 is firmly attached to the end of a tubular piston rod 51 that passes through the center of the piston 50. The tubular rod 51 is open at both its upper and lower ends and its lower end is provided with a constriction or throttle opening 51'. The tubular rod 51 extends upwardly through a valve seat 52 into a cylindrical chamber 53 and has attached thereon a valve piston 54 slideable in the chamber 53 and provided with a packing ring disc 55 on its lower surface to be engageable with the valve seat 52 to constitute a brake accelerator valve 52, 55. A spring 60 urges the piston 54 in the direction to close the valve 52, 55. It is to be noted that under certain circumstances this spring is not required. In addition, the valve piston 54 is provided with a throttle opening 554' which determines the cross section area of the opening between L-sub-chamber 16 and overflow chamber 13 when brake accelerator valve 52, 55 is open.

The main control piston 10 is shown in FIG. 1 in its lower end position in which the outer portion of the ring element 33 abuts against a lower stop 42. From this end position, the main piston 10 has a maximum displacement or stroke $h_3$ into its upper end position which is defined by an upper stop 43. The main piston 10 also has two defined intermediate positions between the upper and lower end positions. In the first intermediate position, main piston 10 is displaced through a stroke $h_4$ to abut against the control piston 50 but without moving the control piston 50 and the accelerator valve 52, 55 remains closed. In the second intermediate position, as well as in its upper end position, the valve piston 55 is raised from its seat 54 and L-sub-chamber 16 is connected to the overflow chamber 13 through throttle opening 54'.

In the wall of the cylindrical chamber 15, there is a number of bores 44, 45 and 46 positioned vertically above each other and connected through a common passage 47 to a lower bore 48 as seen in FIG. 1. In the lower end position of piston 10, packing ring 39 is positioned between lower most bore 48 and the next higher bore 46 so that in this position L-sub-chamber 16 is connected to R-sub-chamber 17 only through bore 48. This lower most end position of the main control piston 10 is designated as "delayed filling position" since the R-sub-chamber 17 is filled from air from L-sub-chamber 16 only through the bore 48.

The main control piston 10 is displaced through a stroke $h_3$ to reach its upper end position in which the packing ring 39 is positioned above the bore 44 so that except for the check valve 40, there is no connection between L-sub-chamber 16 and R-sub-chamber 17.

In its first intermediate position wherein the main piston 10 travels through the stroke $h_2$ and contacts the control piston 50 without raising this control piston, the packing ring 39 is positioned between the bores 45 and 46 so that L-sub-chamber 16 is connected by the two bores 44 and 45 through passage 47 to the R-sub-chamber 17 through both bores 46 and 48. In this filling position of the main control piston 10 R-sub-chamber 17 is not filled through bore 48 as in the delayed filling position but is filled through both bores 46, 48. This filling position is designated as "normal filling position".

In the second intermediate position of the main piston 10, the packing ring 39 is positioned between bore 44 and 45 so that L-sub-chamber 16 is connected to R-sub-chamber 17 only through the upper bore 44. This bore 44 is relatively small in cross section and functions merely to replace pressure losses in R-sub-chamber 17 from the sub-chamber 16.

Above the cylindrical chamber 53 there is the overflow chamber 13 through which passes a rod 57 having on its lower end a valve member 58 whose bottom surface is provided with a packing disc 59 to project into the chamber 53. The disc 59 is engageable with valve seat 56 on the upper portion of the tubular rod 51 to define a venting valve 56, 59. In its open position, venting valve 56, 59 vents the overflow chamber 13 through the tubular rod 51 and through the tubular piston rod 30 wherein the venting characteristic curve is determined by the throttle opening 51'.

The overflow chamber 13 has therein a spring 61 whose lower end rests on the valve member 58 and in the pressureless state maintains the valve pipe 57 in its lower position wherein the accelerator valve 52, 55 is closed and venting valve 56, 59 is open. The spring 61 is selected so as to have a greater force than the spring 60 when this latter spring is used.

After passing through the overflow chamber 13 the valve pipe 57 extends upwardly through a further chamber 62 and its upper open end is provided with a valve seat 68 located in a C-chamber 63 connected to the brake cylinder 24. The valve pipe 57 is slideably guided in coaxial bores 64, 65 provided with packings 66 and 67 so as to maintain a pressure tight separation of the three chambers 12, 62 and 63.

The upper open end of valve pipe 68 is engageable with a packing disc 69 on a valve piston 70 to constitute a release valve 68, 69. The valve piston 70 is displaceable against the force of a spring 71 in an outer valve tubular element 72 which is slideably displaceable and sealed against pressure losses in a cylindrical extension 73. A spring 74 within the tubular element 72 has one end engageable upon an annular stop 74' and the end face of cylindrical insert 73 so as to urge the tubular element 72 downwardly.

The valve tubular element 72 is provided with an annular packing element 75 on its lower side which under the force of spring 74 engages a valve seat 75' to define a brake valve 75, 75' that shuts off C-chamber 63 from a R-chamber 76 connected to the auxiliary air reservoir 4. In the absence of pressure, the valve piston 70 is shifted downwardly under the force of spring 71 against a stop 70' in the valve pipe element 72. In this condition, valve seat 68 of valve pipe 57 is in the open position and the valve pipe 57 in the absence of pressure is shifted under the force of spring 61 to the stop in its lower position. The valve pipe element 57 has a lateral opening 57' within the chamber 62 through which the chamber 62 is connected to chamber 63 when valve seat 68 is open with respect to the packing 69. The brake valve 75, 75' and release valve 68, 69 jointly constitute the brake release control device 14.

When the main control piston 10 is displaced upwardly from its lower position as shown in FIG. 1, the piston 10 first abuts against control piston 50 after traversing stroke $h_4$. Upon subsequent lifting of the main piston 10, the control piston 50 is engaged and carried along and the accelerator valve 52, 55 is opened against the force of spring 60 and the venting valve 56, 59 is closed at substantially the same time without the valve pipe element 57 being lifted. Only after the main piston 10 is displaced further upwardly with a force that overcomes the spring 61 will the release valve 68, 69 be closed after stroke $h_5$ has been traversed by valve seat 68. Further upward movement of main piston 10 through stroke $h_6$ against the additionally opposing force of spring 71 release valve 68, 69 remains closed and brake valve 75, 75' will be opended against the force of spring 74 as piston 70 abuts against stop 74' and lifts the valve pipe element 72 from its seat 75'.

During the lowering of the main control piston 10 from its upper end position into its lower end position, the brake valve 75, 75' is closed first, release valve 68, 69 is then opened, subsequently venting valve 56, 59 is opened and accelerator valve 52, 55 is closed.

Surrounding the tubular valve stem 72 is an R-chamber 76 which is connected through passage 77 and passages 72 to the auxiliary air reservoir (R) 4. R-sub-chamber 17 is connected through passages 21 and 22 to the auxiliary air reservoir 4. C-chamber 63 communicates with C-passage 29 in a manner which is not shown in the drawing and passage 29 is connected to the brake cylinder 24 through brake cylinder line 27.

As may be seen in FIG. 1, underneath the R-sub-chamber 17 there is a cylindrical chamber 80 in which a control piston 79 is slideably displaceable and pressure-tight sealed. The control piston 79 divides the cylindrical chamber 80 into an upper sub-chamber 81 and a lower sub-chamber 82. The upper sub-chamber 81 is in constant communication with the atmosphere through a duct 81'. The lower constantly open end of tubular piston rod 30 on the main control piston 10 passes through R-sub-chamber 17 and terminates in the vented sub-chamber 81. The tubular rod 30 is slideably guided through a bore in a partition that separates the cylindrical chambers 17 and 81. A packing 83 is provided to assure a pressuretight separation of both cylindrical chambers 17 and 81 with respect to each other.

The lower sub-chamber 81 also communicates with the atmosphere through passages 84, 85 or communicates with the overflow chamber 13 through passages 84, 86. The connection of sub-chamber 82 to the atmosphere or to overflow chamber 13 is achieved by the balance valve 7.

The balance valve 7 includes a piston 87 which is sealingly and slideably displaceable in a cylindrical chamber 87' which is sub-divided by the piston 87 into sub-chambers 88 and 89. Sub-chamber 89 communicates with the atmosphere through branch passage 90, a passage 91, and a line coupling 92 on the valve support 2 and a subsequent valve which is not illustrated. The sub-chamber 88 is connected to the chamber 62 through a passage 93. In addition, the sub-chamber 88 is connected to the branch passage 90 through a throttle opening 90' when the piston 87 is in the left end position as seen in FIG. 1.

Piston 87 has a piston rod 94 around which is an annular groove 99 and the rod 94 is sealingly and slidingly displaceable in a cylindrical chamber 95. A packing 96 in the rod 94 seals against pressure losses the sub-chamber 89 from the cylindrical chamber 95. A second packing 97 axially spaced from the packing 96 sealingly separates the cylindrical space 95 from a chamber 98 into which the end of piston rod 94 projects. The chamber 98 is connected to overflow chamber 13 through the passage 86. Both passages 84 and 85 are connected to the cylindrical chamber 95 and in the left end position of piston 87 as seen FIG. 1 these passages are connected to each other by the piston groove 96 while the passage 86 is blocked from passage 84.

If the piston 87 is displaced toward the right as a result of pressure in the overflow chamber 13, packing 97 moves over the connection of passage 84 to space 95 as a result of which the passage 84 is connected to the passage 86 while being blocked from the venting passage 85.

In the service brake portion underneath main control piston 10 and auxiliary piston 11 there is a cylindrical valve sleeve 102 having an enlarged lower end positioned within a $R_1$ chamber 103 and acted upon by a spring 104. The chamber 103 is connected to the emergency brake reservoir ($R_1$) 5. The cylindrical valve sleeve 102 is slideable within a bore 105 which connects to a L-chamber 106 connected to brake line 3. The upper end of the cylindrical valve sleeve 102 terminates in the R-sub-chamber 17 and is provided with a contriction 102'. The upper end of valve sleeve 102 is constantly open as result of the constriction 102' and under the force of spring 104 projects into the sub-chamber 17 below the auxiliary piston 11 so as to be disposed in the displacement path of this piston. Chamber 103 is connected through passages 107 and 26 to the emergency brake reservoir ($R_1$) 5 and the L-chamber 106 is connected through passages 108 to L-sub-chamber 16 which in turn connects to the brake line 3.

The slideable valve sleeve 102 has a lower throttle opening 109 and an upper throttle opening 110. The bore 105 is provided with packings 111 and 111' and the portion of the bore above chamber 106 is provided with a packing 112 that sealingly engages the slideable valve sleeve 102.

In the position of the components as shown in FIG. 1, auxiliary piston 11 acts upon the upper end of valve sleeve 102 which projects into the R-sub-chamber 17 to move the sleeve downwardly into a lower position against the force of spring 104. In this lower position of the valve sleeve 102, the chambers 103 and 106 are connected to each other by the contricted openings 109 and 110 that have certain and predetermined cross sectional areas of the openings. In addition, R-sub-chamber 17 is connected to chambers 106 and 103 through the constricted opening 102' in the upper end of the valve sleeve 103 and through constricted openings 109 and 110.

When the slideable valve sleeve 102 is not acted upon or loaded by the auxiliary piston 11, the sleeve is maintained in its upper end position by the spring 104 in which position opening 109 is located between packings 111 and 111' and opening 110 is positioned above packing 112. In this position, the chambers 103 and 106 are thus shut off in pressure-tight relationship to each other and also with respect to the R-sub-chamber 17.

In addition to the slideable valve sleeve 102, a plunger or pushrod 113 projects into the R-sub-chamber 17 below the auxiliary piston 11 so as to extend into the displacement path of this piston. The plunger 113 is slidably and sealingly displaceable in a bore of the housing and on its lower end is provided with an enlarged or plate-like portion which is freely movable in a valve chamber 114. A packing ring or disc 115 is positioned upon the upper face of the widened end and is engageable with a valve seat 116 to constitute a plunger valve 115, 116. As illustrated in FIG. 1, the plunger 113 is acted upon by the auxiliary piston 11 so as to be pushed into the open position against the force of a spring 117 which also acts upon a check valve 118 to open or close the passage 107 which connects to valve chamber 114. When valve 115, 116 is opened, compressed air thus passes from $R_1$-passage 107 which communicates with the emergency brake reservoir 5 into the L-passage 108 which communicates with the brake line 3.

If the plunger 113 extending into the sub-chamber 17 is not acted upon so as to be loaded by the auxiliary piston 11, the valve 115, 116 is maintained in its closed position under the force of spring 117. L-passage 108 is thus closed from $R_1$-passage 107 and the connection between passages 107 and 108 is interrupted even when the check valve 118 is opened.

It is to be noted that when the plunger 113 is not loaded, it projects under the force of spring 117 into the sub-chamber 17 a lesser distance than the slideable valve sleeve 102 projects into the sub-chamber 17 under the force of spring 104.

When the main control piston 10 is in the braking position, the valve 115, 116 is closed and the valve sleeve 102 is in its shut-off position. The auxiliary piston 11 which is relieved of pressure on its upper surface is thus not able to actuate plunger valve 115, 116 and slideable valve sleeve 102 against the force of springs 117 and 104, respectively. Should the pressure equilibrium in the L and R-sub-chambers on opposite sides of the main piston 10 be varied in order to release the brakes, the auxiliary piston 11 is displaced downwardly before the main piston 10 is displaced downwardly since the auxiliary piston has a greater sensitivity to pressure differences and has less friction or resistance to movement than the main piston 10. This downward movement of auxiliary piston 11 will move the plunger 113 downwardly against the force of spring 117 to open plunger valve 115, 116 after which the valve sleeve 102 will be moved into its connecting position against the force of spring 104 only after a longer stroke of the auxiliary piston 11 and the main piston 10 which in the meantime is displaced downwardly. The plunger valve 115, 116 is thus already switched to the open position by the downwardly moving auxiliary piston 11 before the main piston 10 is displaced downwardly and the valve sleeve 102 is moved into its connecting position only when the plunger valve 115, 116 has been opened.

However, when the main control piston 10 is in its normal filling position as described above, the length of the plunger 113 is such that it remains in its closed position under the force of spring 117 while the valve sleeve 102 presses the auxiliary piston 11 under the force of spring 104 against the supported spring 41 in the main control piston 10. When the auxiliary piston 11 is lifted to its upper stop 34 in the main control piston against the force of spring 41 as a result of increased pressure in the R-sub-chamber 17 and the main control piston 10 is not displaced upwardly from its normal filling position, the length of the valve sleeve 102 is such that the sleeve is in its shutting-off position.

Operation of the service brake portion

The several components of the air brake and control system on each vehicle must first be filled with air so that the vehicle brake system is functional. Air L flows from the brake line 3 through coupling 20 into the passage 19 of the service brake portion 1. Air L then flows through the branch passage 18 into the sub-chamber 16 and through the branch passage 108 into the chamber 106.

At the full supply of air L under line pressure, the main control piston 10 together with the auxiliary piston 11 will be in their lower end positions as shown in FIG. 1. Plunger valve 115, 116 is held in the open position by the auxiliary piston 11. Check valve 118 is in the closed position to separate chamber 117 acted upon by L-air, from $R_1$ branch passage 107. Packing 39 on the main control piston 10 is positioned between the bores 46 and 47 so that sub-chamber 17 and the auxiliary air reservoir 4 are filled with air-L from brake line 3 through bore 48. The slideable valve sleeve 102 is displaced by auxiliary piston 11 against the force of spring 104 into its connecting position wherein chamber 106 is connected to sub-chamber 17 through constriction opening 102' and through the opening 109 to the $R_1$-chamber 103. One of the functions of the slideable valve sleeve 102 is thus to fill the emergency reservoir 5 as determined by the constricted opening 109. In addition, air L also flows from chamber 106 through valve sleeve 102 and opening 102' into sub-chamber 17. The filling of the emergency reservoir 5 with air from brake line 3 begins later and occurs with a greater throttling than the filling of the auxiliary reservoir 4 through the main control piston 10 and the constricted opening 102' in valve sleeve 102.

The control piston 50 in L-sub-chamber 16 is acted upon by air-L so that the accelerator valve 52, 55 is closed and venting valve 56, 59 is open. The overflow chamber 13 is thus connected to the atmosphere through tubular elements 51 and 30 and sub-chamber 81 is connected to the atmosphere through passage 81'. The brake valve 75, 75' is closed by spring 74 which thus prevents the flow of R-air from chamber 76 through the open release valve 68, 69.

The upper surface of control piston 50 is subjected to a force exerted by L-air but this force has no affect on the control piston with respect to the main control piston 10 when the piston 10 is in its lower position since the control piston 50 is mounted on the end of the tubular element 51. The effective surface area of the main control piston 10 which is subjected to the action of L-air depends upon the relationship of an outer annular surface $S_1$ which extends from the periphery of piston 10 to the attachment of diaphragm 32 of auxiliary piston 11 and an inner annular surface $S_3$ which extends from the outer surface of the piston pipe 30 to the inner surface of cylindrical extension 49 on the main control piston. An annular surface $S_2$ which is between annular surfaces $S_1$ and $S_3$ is balanced with respect to L-pressure since the L-air flows into the space between main piston 10 and auxiliary piston 11 through the openings 36 and 37 on the upper surface of main control piston 10. Within this space, L-pressure on the annular surface $S_3$ acts upwardly while the pressure on annular surface $S_1$ acts downwardly as seen in FIG. 1. Thus, the effective surface area of the main control piston 10 subjected to the action of L-air when the main control piston 10 is in its lower position is determined by the difference between the annular surfaces $S_1$-$S_3$.

The corresponding annular surfaces $S_1$, $S_2$ and $S_3$ on the lower surface of annular element 33 and auxiliary piston 11 which are directed to the R-sub-chamber 17 are all acted upon by the pressure R of the auxiliary air reservoir.

As long as there is a large or significant difference between the air pressures in sub-chambers 16 and 17, main control piston 10 and auxiliary piston 11 will always be retained in their lower positions as shown in FIG. 1. If there are substantially equal pressures in the sub-chambers 16 and 17 the pressures on both sides of the auxiliary piston 11 will be balanced but annular surface $S_1$ which is subjected to the pressure from sub-chamber 17 acting against piston 10 in the upward direction is greater than the difference between the annular surfaces $S_1$-$S_3$ subjected to the action of pressure in sub-chamber 16 acting in the opposite direction to urge the main piston 10 downwardly. Thus, when the pressures in sub-chambers 16 and 17 are equal, the main control piston 10 will be lifted through stroke $h_4$ to the stop on control piston 50 into the above mentioned normal filling position because of the differences in the effective piston areas as described above. In addition, auxiliary piston 11 will be raised to abut the supported spring 41 under the action of spring 104 acting upon cylindrical sleeve 102. In this raised position of auxiliary piston 11 and valve sleeve 102, the L-chamber 106 remains connected through openings 102', 109 and 110 to R-chamber 17 and $R_1$-chamber 103. However, the plunger valve 115, 116 under the action of spring 117 has already been moved upwardly into the closed position in this raised position of main piston 10.

When the pressure in R-chamber 17 exceeds the pressure in L-sub-chamber 16 the auxiliary piston will be moved upwardly by the pressure in chamber 17 against the force of spring 41 to upper stop 34 in the main piston 10. During this upward movement of auxiliary piston 11, the piston 11 is disengaged from the end of valve sleeve 102 which now moves into its closed position under the force of spring 104 to close off chamber 106 from R-sub-chamber 17 and R$_1$-chamber 103. The force of spring 41 is so selected that the auxiliary piston 11 is displaced into its upper end position in the main piston 10 under the pressure R-sub-chamber 17 against the force of spring 41 while the main piston 10 is not displaced upwardly at this time and accelerator valve 52, 55 is not opened. The force of spring 104 is less than the force of spring 41 so that the auxiliary piston 11 will not be displaced by the valve sleeve 102 into its upper end position on the main piston 10.

In the normal filling position of main piston 10, packing 39 is between bores 45 and 46, the effective area of the main piston 10 subjected to pressure in the sub-chamber 16 is increased by the effective pressure area of control piston 50 since at this time the control piston 50 is in effect locked in position on main control piston 10. The total effective area on piston 10 in sub-chamber 16 is thus greater than the oppositely acting total piston area in R-sub-chamber 17. This relationship reliably prevents any undesirable actuation of the brake as result of any actuation of accelerator valve 52, 55 as result of a small variation of pressure in the brake line 3.

Upon equalization of the pressures in the sub-chambers 16 and 17 the main control valve 10 will remain in the normal filling position. Thus, actuation of the brake does not require the main piston 10 to travel an unnecessary distance which would adversely affect the speed of propagation of the brake control along the entire length of a train.

It is apparent that the effective surface ratios on the main and auxiliary pistons 10 and 11 can be so selected that the main piston 10 is lifted from its delayed filling position, i.e. its lower end position, into its normal filling position even before pressure equilibrium is attained in the sub-chambers 16 and 17. In the delayed filling position, e.g. up to a pressure of 4.7 atmospheres overpressure in auxiliary reservoir 4 the filling operation is slowed since filling occurs through bore 48 from brake line 3. The remaining filling operation in the normal filling position of the piston 10 to pressure equilization at about 5 atmospheres overpressure between brake line 3 and the auxiliary air reservoir 4 is carried out at a faster rate since in this position filling occurs through bore 46 in addition to bore 48.

As a result of the delayed filling position during normal release of the train brakes, the refilling of the reservoirs of the individual brake systems on the railway vehicles can be started only after the brake line pressure has been build up sufficiently to be able to secure a release of adjacent brake control valves.

In the embodiment of the invention as disclosed herein, a difference in surface area S$_1$-(S$_1$-S$_3$) exists on main control piston 10 which surface difference is subjected to the action of L-air and leads to a loading of the main control piston 10 so that the piston is displaced in the direction of its upper end position. It is apparent that a corresponding surface difference can also be provided on the auxiliary piston 11 which is then subjected to the action of R-air. For example, the auxiliary piston 11 could be constructed as a stepped piston which is sealingly and slideably displaceable on a stepped valve tubular element 30.

The service braking operation

In a service braking operation, the pressure in the brake line 3 is either decreased in stages or continuously. The pressure in the brake line can thus be reduced to such an extend that full braking action is obtained. The emergency brake portion which is provided for a rapid braking action will not function during service braking since the decrease of pressure in the brake line is selected to be less than that required to carry out a rapid braking action.

When the pressure in the brake line 3 is decreased during a service braking operation, the main control piston 10 together with the auxiliary piston 11 will be displaced upwardly from its normal filling position because of the pressure difference thus established in the sub-chambers 16 and 17 and will carry along control piston 50. The accelerator valve 52, 55 will then be actuated into its open position and venting valve 56, 59 is actuated into its closed position. This connects the overflow chamber 13 to L-sub-chamber 16 as a result of which a certain lowering of pressure will occur in the sub-chamber 16 as determined by the constricted opening 54' and accordingly a corresponding decrease of pressure will occur in brake line 3.

After this connection of overflow chamber 13, air will flow from the overflow chamber 13 through passage 86 to balance valve 7 where upon the piston 87 will be shifted to the right from its left vented position against the force of spring 88' in order to connect passage 86 to passage 84 which then no longer communicates with venting passage 85. The air in passage 84 thus flows from overflow chamber 13 into the space underneath piston 79 which is then displaced upwardly to accelerate the switching of the main piston 10 into the braking position. During this upward movement of piston 10, packing 39 will move past the bores 45 and 44 to a position above bore 44 as the piston 10 is moved to the stop in its braking position. In this position of piston 10, communication between the sub-chambers 16 and 17 is blocked. The tubular element 51 which is lifted by the main piston 10 moves valve piston 57 upwardly against the force of spring 61 to close release valve 68, 69. During further upward movement of the main piston, the valve piston 70 is shifted against abutment 74' on which is supported the spring 74 and the valve element 72 is subsequently lifted to open the brake valve 75, 75' so that air of the auxiliary reservoir can flow from R-chamber 76 into C-chamber 63 through which action is exerted on the brake cylinder.

When the pressure from auxiliary reservoir 4 is reduced through the open brake valve 75, 75' toward brake cylinder 24 to such an extend that it corresponds substantially to the reduced pressure in the brake line 3, a pressure equilibrium will be substantially established in the sub-chambers 16 and 17. The spring 74 will then shift the main control piston 10 downwardly to close brake valve 75, 75' while the release valve 68, 69 remains closed and the main piston 10 is in its upper braking position wherein the packing ring 39 is located above the bore 44. Thus, communication is blocked between the sub-chambers 16 and 17.

If there should be any loss of pressure in the auxiliary reservoir 4, such as from leakage, the main control piston 10 will be shifted downwardly from its upper braking position into its lower braking position in which the packing ring 39 moves downwardly past bore 44. The bore 44 is of a relatively small cross sectional area so selected that pressure losses in the auxiliary reservoir 4 are compensated by the flow of L-air into the sub-chamber 17 through bore 44.

However, in the lower braking position of the main piston 10, release valve 68, 69 remains closed so that air from brake cylinder 24 is not vented to the atmosphere through C-chamber 63, tubular element 57, chamber 62 and accelerator valve 52, 55 through passage 91. The balance valve 7 will thus remain in its switching position under the effect of air from overflow chamber 13 and the piston 79 will thus be subjected to air from overflow chamber 13. Accordingly, in the lower braking position of the main piston 10, piston 70 carrying packing disc 69 for engagement with valve seat 68 is situated in a position between upper stop 74' of spring 74 and upper piston stop 70'.

It is not necessary that the piston 70 be displaceable within the tubular element 72 if only a single brake closing position is provided for the main piston 10 and which position corresponds to the above mentioned lower braking position. In such a construction, the piston 70 is fixed within the tubular element 72, spring 71 is omitted and the spring 74 is not supported.

Release operation subsequent to braking

To release the brakes after a braking operation, the pressure in the brake line 3 is increased through the pressure in the auxiliary air reservoir 4. Because of the greater sensitivity of response of the auxiliary position 11 with respect to the main piston 10, the piston 11 is switched downwardly substantially simultaneously with the increase in the brake line pressure. The plunger valve 115, 116 is immediately opened upon this downward movement of the auxiliary piston 11 and simultaneously or subsequently to opening of valve 115, 116 cylindrical valve sleeve 102 is displaced into its connecting position but before main control piston 10 is displaced from its brake closing position to its normal filling position. In the initial phase of this release operation $R_1$-air flows from the emergency brake reservoir 5, passages 26 and 27 and through open check valve 118, through open plunger valve 115, 116 into L-passage 108 connected to L-brake line 3. The flow of this $R_1$-air has an order of magnitude which brings about the release of brakes on subsequent railway vehicles.

After or virtually simultaneously with establishing of the release acceleration, $R_1$-air flows at a rate determined by the constricted opening 102' in valve sleeve 102 into R-sub-chamber 17 and subsequently to the auxiliary reservoir 4. In addition, constricted opening 110 of valve sleeve 102 establishes a connection between L-chamber 106 and R-sub-chamber 17 so that in addition to the air flowing from sub-chamber 17 to sub-chamber 16 air also flows from the $R_1$-chamber 103 and from R-sub-chamber 17 through constricted opening 110 into L-chamber 106 and subsequently through passage 108 to L-sub-chamber 16. Should the pressure in auxiliary reservoir 4 increase so as to be greater than the pressure in brake line 3 the auxiliary piston 11 will be shifted against the force of spring 41 into its upper end position on the main piston 10. Slideable valve sleeve 102 under the force of spring 104 will then be shifted into its closed position to shut off the connection between $R_1$-chamber 103 and R-sub-chamber 17 to L-chamber 106.

Shutting off chamber 103 from sub-chamber 17 brings about a change in volume as result of which the connection of sub-chamber 17 to the sub-chamber 16 is simultaneously switched off and only the connection of sub-chamber 17 through bore 48 to sub-chamber 16 remains.

Thus, brake response remains the same whether $R_1$-chamber 103 is connected or disconnected.

The regulation or control of the flow of $R_1$-air from emergency reservoir 5 into auxiliary reservoir 4 is in accordance with the increase in brake line 3 and/or the cross sectional area of the opening of constriction 109.

After release acceleration has been established by the opening of plunger valve 115, 116, main control piston 10 will be shifted into its delayed filling position. Tubular valve elements 57 and 51 are similarly shifted downwardly by springs 61 and 60. During the shifting movements, release valve 68, 69 and venting valve 56, 59 are switched into their open positions and accelerator valve 52, 55 is switched into its closed position since the control piston 50 is disengaged from main control piston 10. Brake valve 75, 75' remains closed.

The overflow chamber 13 and the cylindrical chamber 98 of balance valve 7 are vented through venting valve 56, 59 at a rate determined by constriction 51'. Piston 87 of balance valve 7 will then be shifted into its left end position under the force of spring 88' wherein the chamber 88 is connected through contricted opening 90' to passage 90 for venting to the atmosphere. With the switching of balance valve 7 toward the left, passage 84 is connected to venting passage 85 so that the chamber 82 under piston 79 is vented which has the effect of accelerating the displacement of main control piston 10 into its lower end position.

L-air now flows through bore 48 from sub-chamber 16 into sub-chamber 17 in order to fill the auxiliary reservoir 4. Further, the connection between L-chamber 106 and sub-chamber 17 remains open.

As soon as the pressures in the brake line 3, the auxiliary reservoir 4 and the emergency reservoir 5 become equal, the valve sleeve 102 initially assisted by plunger 113 will press auxiliary piston 11 against the supported spring 41. This position is the closed position of plunger valve 115, 116 but the connections through slidable valve sleeve 102 remain open. The release acceleration operation is now completed. The connections through valve sleeve 102 will close only when, as described above, the pressure of the auxiliary reservoir 4 exceeds the brake line pressure 3 or the main control piston 10 is lifted from its delayed filling position.

While the supplying of air to overflow chamber 13 occurs as determined by the size of constriction 54' and the venting of overflow chamber 13 is determined by the size of constriction 51', constriction 54' can also be located into the end 58 of the valve pipe 57 outside of the packing disc 59 carried by the end 58. If the end 58 is formed as a piston which is sealingly and slidably displaceable in the cylindrical space 53. The valve piston 54 can then be constructed as a simple valve plate. This construction is based on the condition that the constriction 54' for supplying air into overflow chamber 13 is not smaller in size than the constriction 51' for venting the overflow chamber 13.

Figure 2:
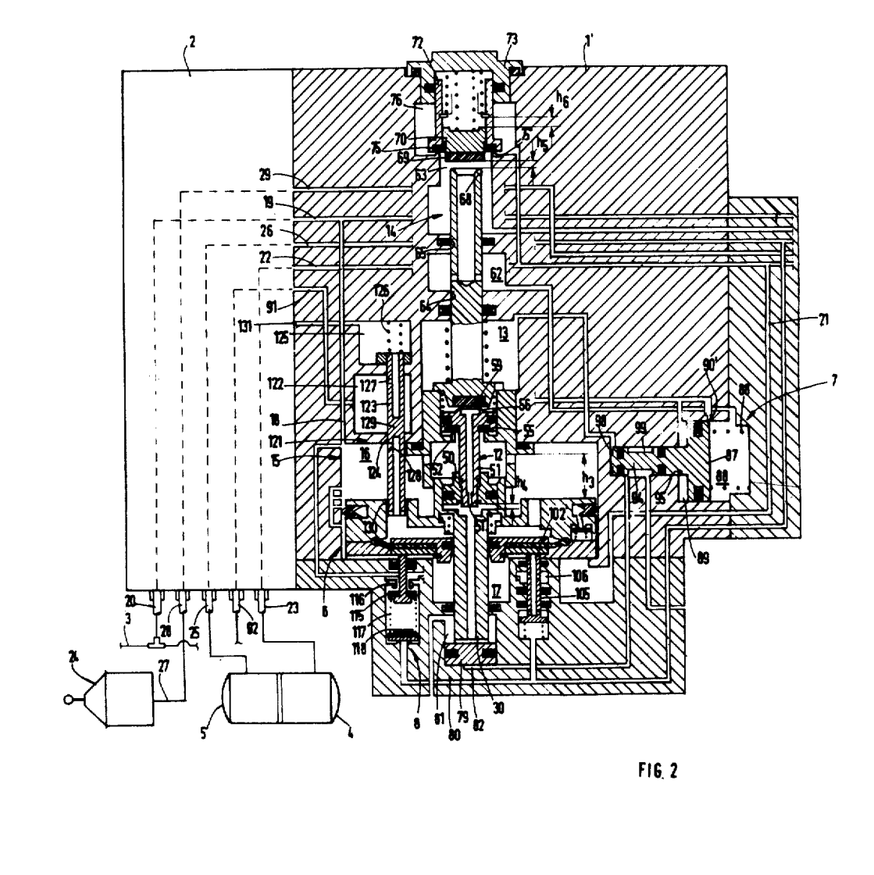
FIG. 2 is a view similar to that of FIG. 1 and showing a modification thereof wherein the service brake portion is provided with a service brake accelerator operative at each braking stage.

In FIG. 2, there is illustrated a service brake portion 1' which is similar to the service brake portion 1 of FIG. 1 except for the service brake accelerator which is to be presently described. The service brake portion 1' similarly comprises the main control element 6, balance valve 7, release acceleration valve 8 and a pressure limiting valve, which is not shown in the drawing, but is employed for automatically setting a minimum brake pressure in the brake cylinder independently of any decreasing of the pressure in the brake line (L). Also illustrated in FIG. 2 is the valve support 2 and the connected reservoirs, brake cylinder and brake line.

With respect to FIG. 1, FIG. 2 provides a service brake accelerator 121 which is effective at each braking stage and which comprises an additional overflow chamber 122 in addition to accelerator valve 56, 59 which are components of the overflow chamber 13.

The service brake accelerator 121 comprises a valve pipe 123 slidably and sealingly guided in a bore 124 in the housing. The valve pipe 123 has one end projecting into L-sub-chamber 16 and its other end traverses chamber 122 and terminates in a venting chamber 125 which is in continuous communication with the atmosphere through a passage 131.

The upper end of valve pipe 123 which is located in the venting chamber 125 is acted upon by a spring 126 which determines the response or sensitivity of the valve pipe. Valve pipe 123 is open at both ends and has two lateral constricted openings 127 and 128 therein but there is a barrier or wall 129 within the valve pipe to shut off any communication between the openings 127 and 128 through the valve pipe.

The valve pipe 123 is shown in a position in FIG. 2 in its lower end position and urged into this position by the spring 126. The lower end of valve pipe 123 extends through an opening in the main piston 10 to project into the main piston a distance as shown in FIG. 2. If the main piston 10 should be displaced upwardly together with auxiliary piston 11, the auxiliary piston engages the lower end of valve pipe 123 and shifts the valve pipe 123 against the force of spring 126 into its upper switching position. In this position, L-sub-chamber 16 is connected to overflow chamber 122 through the lower end of valve pipe 123 and opening 128 while the opening 127 is positioned above the valve pipe packing between chamber 122 and venting chamber 125 so that venting of chamber 122 is shut off.

Operation of the service brake portion (FIG. 2)

The initial filling operation to supply the components of the air braking system with air and the release operation after a braking operation are similar to the corresponding functions in the service brake portion 1 of FIG. 1 so that further description of these functions is not necessary. The service brake accelerator 121 of FIG. 2 operates merely during a service braking operation.

As described with respect to FIG. 1, the brake line pressure is lowered progressively in stages until the full braking action is attained in the last braking stage. However, the emergency brake portion which is provided for a rapid braking action and which has not been described in FIG. 2 does not function during a service braking operation since the lowering of pressure in the brake line per unit of time is always selected to be less than that required to initiate a rapid braking action.

During a service braking operation, when the pressure in the brake line is lowered for the first braking stage, main control piston 10, together with auxiliary piston 11, is shifted upwardly from its normal filling position as described in FIG. 1 because of the pressure difference established in the sub-chambers 16 and 17. During this upward shifting, main piston 10 will take along control piston 50 to switch accelerator valve 52, 55 into its opened position and to switch venting valve 56, 59 into the closed position. As described in connection with FIG. 1, this switching action connects overflow chamber 13 to L-sub-chamber 16 which for the first braking stage produces a rapid decrease of pressure in L-sub-chamber 16 and accordingly a corresponding decrease of pressure in the brake line 3 (L).

After the overflow chamber 13 is connected, air flows from this overflow chamber through passage 86 to the balance valve 7 whose piston 87 is shifted to the right by the incomming air. Passage 86 is thus connected to passage 84 so that air from the overflow chamber 13 is introduced under piston 89 to press this piston upwardly so that in the manner corresponding to FIG. 1, the switching of the main control piston 10 into its braking position is further accelerated.

In contrast with the operation of the service brake portion of FIG. 1, the auxiliary piston 11 now switches the valve pipe 123 upwardly to connect the L-sub-chamber 16 to overflow chamber 122 after disconnecting the venting of the overflow chamber 122 through the venting chamber 125. The upwardly moving main piston 10 overcomes the force of spring 61 so that the valve rod 57 is shifted upwardly to close release valve 68, 69 and subsequently to open brake valve 75, 75'. The pressure in the auxiliary air reservoir 4 is then decreased through the open brake valve 75, 75' toward the brake cylinder 24 in accordance with the controlled decrease of pressure L in the brake line 3.

When the pressure in the auxiliary reservoir 4 corresponds to the pressure in the brake line 3, main control piston 10 will be shifted from its upper braking position into its lower braking position as described in connection with FIG. 1 wherein the brake valve 75, 75' and release valve 68, 69 are again closed and the sub-chambers 16 and 17 are connected to each other through bore 44. The upper brake-closing position has been described above in connection with FIG. 1.

However, prior to establishing pressure equilibrium between auxiliary reservoir 4 and brake line 3, the auxiliary piston 11 is shifted downwardly into its lower end position against stop 35 in main piston 10 under the action of supported spring 41 in the main piston 10 and spring 126 which urges the valve pipe 123 downwardly. Approximately at that time when the pressures are equal between the auxiliary reservoir 4 and the brake line 3, valve pipe 123 is already shifted downwardly by spring 126 to such an extent that the connection between sub-chamber 16 and the overflow chamber 122 is shut off and the overflow chamber 122 is again connected to the venting chamber 125.

As described above, the main control piston 10 will remain in its upper brake-closing position in the absence of any air losses through leakage in the auxiliary reservoir or will remain in its lower brake-closing position, should any leakage of air from the auxiliary reservoir occur, until the next braking stage is introduced or a brake release operation is initiated by the operator of the train.

If the pressure in the brake line is further reduced so as to introduce a subsequent braking stage, the main piston 10 initially remains in its brake-closing position and only the auxiliary piston 11 will be shifted upwardly because of the pressure difference in the sub-chambers 16 and 17. Valve pipe 123 will again be displaced from its lower switching position into its upper switching position wherein sub-chamber 16 is connected to overflow chamber 121 and this overflow chamber is shut off from venting chamber 125. This action will produce a definite decrease of pressure in the L-sub-chamber 16. During this pressure decrease, the auxiliary piston 11 is moved upwardly to abut main control piston 10 which under the sudden decrease of pressure in sub-chamber 16 is lifted with accelerated action into its braking position wherein brake valve 75, 75' is shifted into the open position. Pressure in the auxiliary reservoir 4 is then further reduced through open brake valve 75, 75' toward the brake cylinder 24 in accordance with the introduced second braking stage.

Because of the selected strength of spring 126 acting upon valve pipe 123, the auxiliary piston 11 will be switched with a greater sensitivity than the main control piston 10. In order to introduce each braking stage, the auxiliary piston 11 connects the overflow chamber 122 to the sub-chamber 16 in order to switch the main control piston 10 from its brake-closing position into the braking position as result of the decrease of pressure in L-sub-chamber 16. When the particular braking stage is introduced into the brake cylinder, the overflow chamber 122 is again disconnected from sub-chamber 16 by auxiliary piston 11 and the overflow chamber is again vented as described above so as to be in position for a subsequent braking stage.

Figure 3:
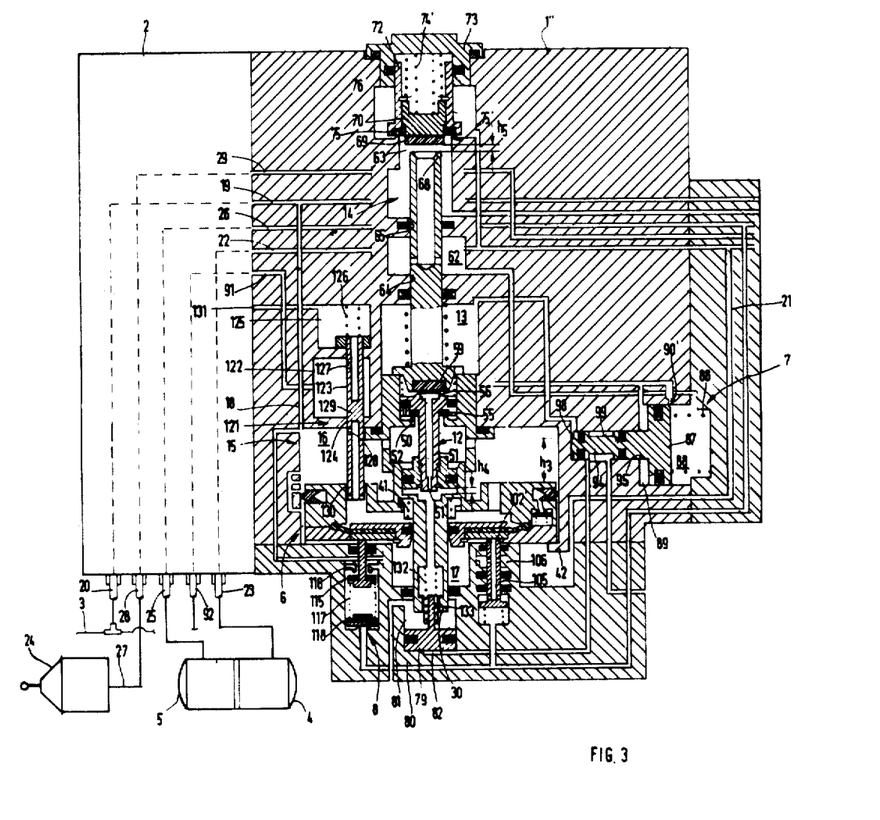
FIG. 3 is a view similar to that of FIG. 2 and showing a modification of the service brake portion of FIG. 2.

In FIG. 3, there is illustrated a further service brake portion 1" which substantially corresponds to the service brake portion 1' of FIG. 2. However, service brake portion 1' differs from that of FIG. 2 in that a supported spring 132 is provided on the lower end of the tubular piston rod 30 and this spring is guided by a central pin 133 extending upwardly on a piston 79' corresponding to the piston 79 of FIGS. 1 and 2. In addition, piston 70 is fixed within the valve pipe 72 which is loaded by spring 74 in the closing direction of brake valve 75, 75'. The spring 132 has a force which corresponds to sum of the forces of both springs 61 and 74 which are also employed in this FIG. 3 construction. However, the spring 60 of FIG. 1 which loads piston 54 of accelerator valve 52, 55 is not included in the structure of FIG. 3. The packing disc 69 for closing valve seat 68 is so resilient that the closing of both brake and release valves 75, 75' is attained in the brake-closing position of main control piston 10. It is thus not required that piston 70 together with packing disc 69 be displaceable within valve pipe 72 as in FIGS. 1 and 2 against the force of additional spring 71.

The modification of FIG. 3 is particularely advantageous in connection with the service brake accelerator 121 described above with respect to FIG. 2.

As soon as the L-sub-chamber 16 is connected to overflow chamber 13 through the opening of the accelerator valve, air flows from overflow chamber 13 to the space under piston 79 which then presses upwardly against supported spring 132 which thus becomes effective with respect to the main piston 10 and switches the piston 10 into the braking position against the forces of both opposing springs 61 and 74. Spring 132 is thus particularly advantageous for switching the main control piston 10 independently of pressure.

Thus it can be seen that the present invention provides a brake control valve having in the main control piston an auxiliary piston one side of which is subjected to the action of brake line air and the other side of which is subjected to the action of air in the auxiliary reservoir and wherein the auxiliary piston is displaceable between two stops on the main control valve with a greater sensitivity or faster reaction than the main control valve. The auxiliary valve controls at least one valve device which has an actuating portion projecting into the displacement path of the auxiliary piston. The valve devices may comprise a release acceleration valve and a filling valve. This structure thus provides a release acceleration valve which is structurally and functionally a component of the service brake portion of the brake control valve.

It will be understood that this invention is susceptible to modification in order to adapt it to different usages and conditions, and accordingly, it is desired to comprehend such modifications within this invention as may fall within the scope of the appended claims.

What is claimed is:

1. In a two-pressure brake control valve for a single stage releasing indirectly acting airbrake for railway vehicles having a service brake portion connected to a brake line, an auxiliary reservoir, an emergency reservoir and a brake cylinder, said service brake portion comprising a slidingly displaceable main piston connected to said brake line and auxiliary reservoir to be responsive to the difference in pressure between said brake line and auxiliary reservoir and displaceable in response to the difference in pressure in said brake line and auxiliary reservoir during braking and release operations, an auxiliary piston slidably displaceable in said main piston between two end positions and one side subjected to brake line pressure and the other side subjected to auxiliary reservoir pressure, said auxiliary piston having a greater sensitivity of response to pressure difference than said main piston, a release acceleration valve connected to the brake line and to the emergency reservoir, means in the displacement path of said auxiliary piston and responsive to movement of the auxiliary piston for actuating said release acceleration valve to an open position to connect said emergency reservoir to said brake line in the initial phase of a release operation, and means responsive to said actuating means for connecting said emergency reservoir to said auxiliary reservoir during the release operation.

2. In a two-pressure brake control valve as claimed in claim 1 wherein said main piston has a recess therein, said auxiliary piston comprising a diaphragm piston having its periphery attached sealingly to said recess.

3. In a two-pressure brake control valve as claimed in claim 1 wherein said main piston has a central piston rod attached thereto, said auxiliary piston having a central opening slideably and sealingly receiving said central piston rod therethrough.

4. In a two-pressure brake control valve as claimed in claim 3 wherein said central piston rod has at least one control passage therein.

5. In a two-pressure brake control valve as claimed in claim 3 wherein said main piston comprises a piston element having a cylindrical recess in one side thereof and there being at least one opening between said recess and the other side of said piston element, a ring element attached to said one side of said main piston surrounding said recess, said diaphragm piston being attached between said ring element and said piston element, said recess defining a first end position for said diaphragm piston and said ring element defining a second end position for said diaphragm piston.

6. In a two-pressure brake control valve as claimed in claim 1 and further comprising spring means supported between said main piston and said auxiliary piston.

7. In a two-pressure brake control valve as claimed in claim 1 wherein said actuating means comprises a stem on said release acceleration valve extending into the displacement path of said auxiliary piston.

8. In a two-pressure brake control valve as claimed in claim 7 wherein said release acceleration valve comprises a valve between said emergency reservoir and said brake line and having said stem thereon, and a check valve operable to connect said emergency reservoir with the brake line when said release acceleration valve stem is actuated by said auxiliary piston.

9. In a two-pressure brake control valve as claimed in claim 1 wherein said connecting means comprises a filling valve between the emergency reservoir and the auxiliary reservoir and having an actuating stem extending into the displacement path of said auxiliary piston so as to be actuated thereby.

10. In a two-pressure brake control valve as claimed in claim 9 wherein said filling valve comprises a slideable cylindrical valve sleeve having one end defining said actuating stem and another end acted upon by a second spring, there being a first throttle opening in said one end, there being a second throttle opening in said valve sleeve spaced from said first throttle opening and said second opening connected to the brake line only upon actuation of said filling valve by said auxiliary piston, there being a third throttle opening at said other end and connected to said emergency reservoir only when said filling valve is actuated by said auxiliary piston, said emergency reservoir being filled through said third opening with air from the auxiliary reservoir through said first opening and with air from said brake line through said second opening through said valve sleeve.

11. In a two-pressure brake control valve as claimed in claim 1 wherein said release acceleration valve is actuated by said auxiliary piston to connect said emergency reservoir to the brake line prior to movement of said main piston from the braking to the release position.

12. In a two-pressure brake control valve as claimed in claim 11 wherein said release acceleration valve is actuated by said auxiliary piston one of prior and simultaneously to actuation of said emergency reservoir connecting means.

13. In a two-pressure brake control valve as claimed in claim 10 and further comprising first spring means supported between said main piston and said auxiliary piston, said auxiliary piston being retained by said filling valve actuating stem abutting said first supported spring when said main piston is in a normal filling position such that said emergency reservoir is filled through said filling valve and said release acceleration valve is closed, said auxiliary piston being free from contact with said filling valve actuating stem when said auxiliary piston is in its end position against the force of said first supported spring and in abutment with said main piston in the normal filling position of said main piston.

14. In a two-pressure brake control valve as claimed in claim 1 and further comprising a service brake acceleration valve effective during each braking stage and actuated by said auxiliary piston.

15. In a two-pressure brake control valve as claimed in claim 14 wherein said service brake acceleration valve comprises a spring loaded slideable cylindrical valve sleeve having one end projecting through an opening in said main piston into the displacement path of said auxiliary piston.

16. In a two-pressure brake control valve as claimed in claim 15 wherein said valve sleeve has fourth and fifth throttle openings therein and having another end, there being an overflow chamber and a vent chamber and said valve sleeve passing slideably through said overflow chamber with its other end in said vent chamber, the brake line pressure side of said main piston being connected to said overflow chamber through said fourth opening while simultaneously blocking connection between said vent and overflow chambers when said valve sleeve is actuated by said auxiliary piston, said valve sleeve blocking the connection between said overflow chamber and the brake line pressure side of said main piston and connecting said overflow chamber to said vent chamber through said fifth opening when said valve sleeve is disengaged from said auxiliary piston.

* * * * *